United States Patent [19]

Molloy et al.

[11] Patent Number: 4,560,007
[45] Date of Patent: Dec. 24, 1985

[54] FIRE PREVENTION AND EXTINGUISHING ASSEMBLY

[75] Inventors: James O. Molloy, Belmont; Peter E. Sydenham, London; Roman A. Hulejczuk, Crawley, all of England

[73] Assignee: Fisons plc, Ipswich, England

[21] Appl. No.: 577,246

[22] Filed: Feb. 6, 1984

[30] Foreign Application Priority Data

Feb. 8, 1983 [GB] United Kingdom ................ 8303483
Oct. 11, 1983 [GB] United Kingdom ................ 8327174

[51] Int. Cl.⁴ .......................................... A62C 35/02
[52] U.S. Cl. .................................................. 169/54
[58] Field of Search ................ 169/54, 56, 57, 16, 169/91, 60, 59, DIG. 3, 42

[56] References Cited

U.S. PATENT DOCUMENTS 3,195,648  7/1965  Atack ..................................... 169/59

FOREIGN PATENT DOCUMENTS 2390972  12/1978  France .................................. 169/42

Primary Examiner—Jeffrey V. Nase
Assistant Examiner—Scott D. Malpede
Attorney, Agent, or Firm—Marshall, O'Toole, Gerstein, Murray & Bicknell

[57] ABSTRACT

There is described a carbon bed absorber (7) including a temperature sensor (10), e.g. a conduit (10) which fuses at a predetermined temperature, wherein the sensor (10) is operably linked (11, 15) to a supply of fire extinguishing fluid (14) to cause flow of the fluid to the bed (7) on the sensor (10) sensing a predetermined elevated temperature. In a preferred embodiment, the temperature sensor is an optical fibre (10) which fuses at the predetermined temperature.

5 Claims, 1 Drawing Figure

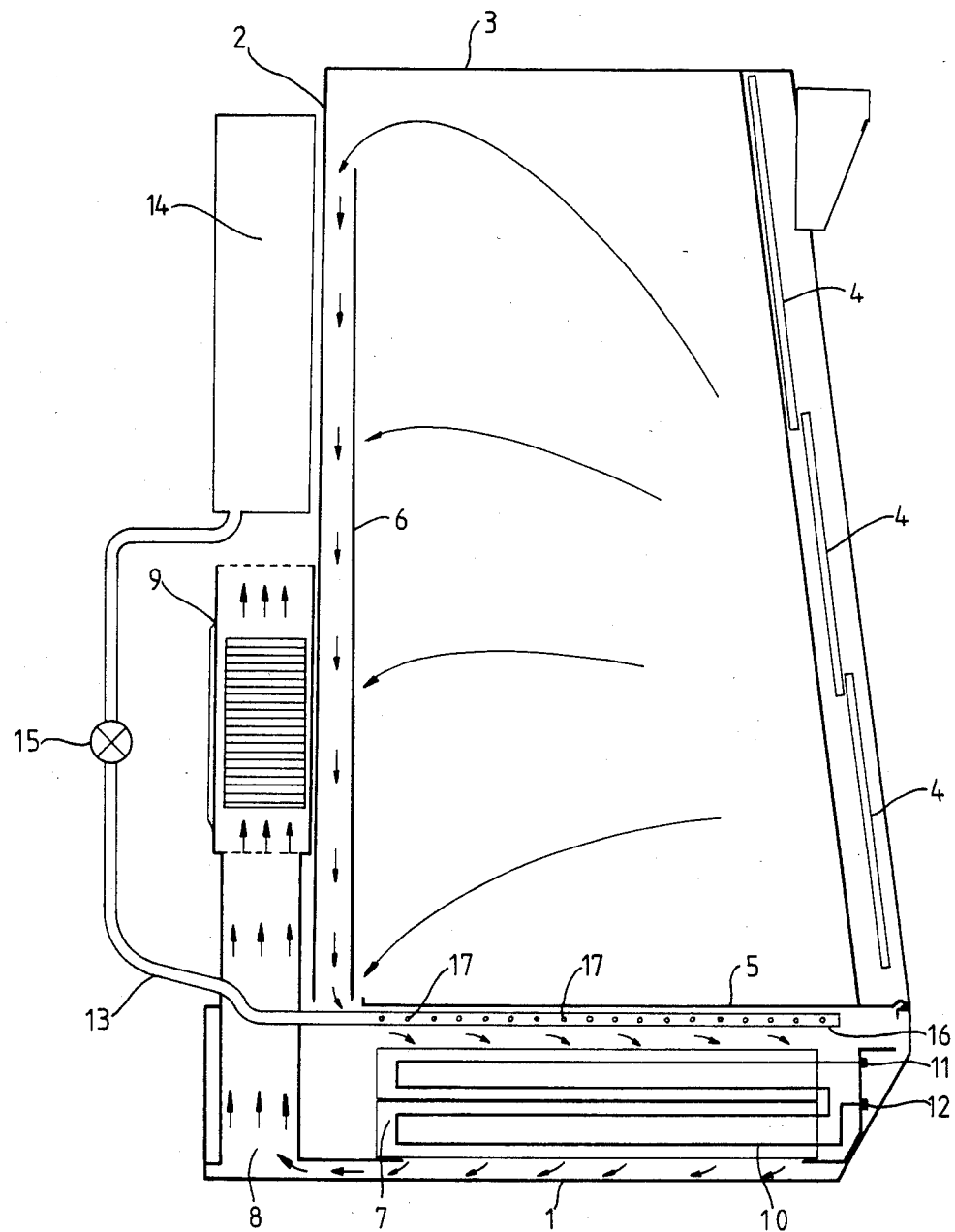

FIRE PREVENTION AND EXTINGUISHING ASSEMBLY

This invention relates to improvements in the operation and safety of carbon bed absorbers, and in particular in the prevention and extinguishing of fires in such beds.

In conventional fume cabinets for use in laboratories, and in other extraction apparatus in which carbon bed absorbers are incorporated, the extracted air is passed through a bed of activated carbon or charcoal (e.g. in granular form) to absorb pollutants such as odours, vapours and gases.

It has been found that under certain conditions spontaneous ignition of the carbon or charcoal may occur. The consequent fire spreads rapidly if unchecked and can cause considerable damage to the fume cabinet and the surroundings. Spontaneous ignition is particularly likely to occur when the carbon bed absorber, e.g. in a fume cabinet, has been used for the extraction of ketones, aldehydes or organic acids; when the bed of carbon or charcoal granules has become saturated with pollutants; and when the extraction process is restarted after a period in which the bed has not been in use.

Previous methods of preventing damage have involved the monitoring of the extracted gas after it has passed through the carbon bed, e.g. for CO and/or $CO_2$ concentrations. If the concentration of CO or $CO_2$ goes above a certain level an alarm is given and action taken to put out the fire. However, this method suffers from the disadvantage that it has a slow response time, and that a fire may be well established before it is detected.

We have now found an improved means of preventing and extinguishing a fire in a carbon bed.

According to the invention we provide a carbon bed absorber including a temperature sensor operably linked to a supply of fire extinguishing fluid, to cause flow of the fluid to the bed on the sensor sensing a predetermined elevated temperature.

The temperature sensor may be, for example, a thermistor or a thermocouple. However, the temperature sensor preferably comprises a portion, e.g. a conduit, which fuses in response to said predetermined elevated temperature.

Such a conduit may be made of plastics material and be in the form of a meltable tube. The tube may enclose, and directly communicate with a supply of fire extinguishing fluid. However, the conduit is preferably an optical fibre, capable of communicating light from a light transmitter to a light detector. The fibre may be made of glass, or preferably, plastics material. We particularly prefer the fibre to be made of plastics material with a melting point of between 150° and 200° C., e.g. 170° C. The melting point of the conduit determines the temperature at which fire extinguishing fluid is caused to flow to the bed.

The conduit may run straight through the bed, e.g. when the bed is rectangular, the conduit may run diagonally from one vertex to the opposing vertex. However, we prefer the conduit to extend throughout the whole bed, so that a local area of the bed at the predetermined elevated temperature, e.g. a hot spot, is capable of being sensed by the sensor. Thus the conduit may take for example a spiral path, a 'W' shaped path, a 'Z' shaped path, a zig-zag path or a series of connected hairpins, through the bed. Typically, for an optical fibre of 1 mm circular diameter, the fibre may make a connected series of hairpins, e.g. 20–500 mm, preferably 60–100 mm apart.

The temperature sensor may be operably linked directly, as in the example of the meltable tube, or indirectly to actuate the supply of fire extinguishing fluid. Suitable fluids include water, carbon dioxide and halocarbon such as BCF.

The supply of fire extinguishing fluid may be controlled by any suitable valve, e.g. a solenoid valve, on a signal from the temperature sensor. The valve is preferably located on a conduit communicating the supply, e.g. a reservoir, with the carbon bed.

According to the invention we also provide a carbon bed absorber including a temperature sensor, wherein the sensor is capable of being operably linked to a supply of fire extinguishing fluid to cause flow of the fluid to the bed on sensing a predetermined elevated temperature.

According to the invention we further provide a fire prevention and extinguishing system which comprises a carbon bed absorber including an optical fibre which extends throughout the bed, the fibre being in optical communication between a light transmitter and a light detector, a supply of fire extinguishing fluid communicating with said bed by means of a conduit, the conduit being provided with a valve, the valve being actuated by an effective decrease in light detected by the detector, the fibre being fusable at a predetermined elevated temperature such that in operation fusion of the fibre at the temperature causes an effective decrease in light detected by the detector, actuation of the valve and flow of fire extinguishing fluid to the bed.

An effective decrease in light detected by the detector is, for example, a decrease of at least 50% of the signal detected. The decrease in light detected is caused by a portion of the fibre partially or completely fusing.

A preferred embodiment of the invention will now be illustrated with reference to the accompanying drawing, which is a schematic vertical section through a fume cabinet, containing a carbon bed absorber according to the invention.

A fume cabinet comprises a base 1, a rear panel 2, a roof panel 3, slidably mounted transparent front panels 4 and an interior working surface 5 supported above the base 1. The interior of the cabinet is provided with a vertically disposed baffle 6, in close proximity to the rear panel 2, which terminates a short distance beneath the roof panel 3. A carbon bed absorber, in the form of a pair of elongate blocks 7, is horizontally disposed between the base 1 and the working surface 5.

Air from the interior of the fume cabinet is drawn over the baffle 6, through the carbon bed 7 and along a corridor 8, on the exterior of the rear panel 2 by an extraction fan 9 mounted on the rear panel 2.

The carbon bed absorber 7 includes a temperature sensor in the form of an optical fibre 10, which runs throughout the bed 7 in the form of an extended 'W'. The optical fibre 10 is provided at its upper terminus with a light transmitter 11 and at its lower terminus with a light detector 12. A supply of fire extinguishing fluid, e.g. water, in the form of a conduit 13 terminates at one end in a sprinkler bar 16 just above the carbon bed 7 and is in fluid communication with a reservoir 14 mounted above the fan 9 on the exterior of the rear panel 2. The sprinkler bar 16 is provided along its length with a plurality of perforations, 17. A solenoid valve 15 regulates fluid flow along the conduit 13. The valve is controlled by the light detector 12, such that an effective decrease in light signal detected by the detector 12 causes the solenoid valve 15 to open.

In operation, the reservoir 14 contains a fire extinguishing fluid, e.g. water. Light is directed along the optical fibre 10 from the transmitter 11 to the detector 12, and the solenoid valve 15 on the conduit 13 is in the closed position. Air is drawn from the interior of the cabinet, through the bed 7 by the fan 9 as shown by the arrows.

Upon a rise in temperature of the bed 7 to the fusion point of the fibre 10, the optical fibre 10 fuses. This prevents the light signal from transmitter 11 being detected by the detector 12, and causes the solenoid valve 15 to open. Fire extinguishing fluid contained in the reservoir 14 then flows down the conduit 13 and is directed on to the bed 7. The base 1 of the cabinet retains the fluid after supply to the bed 7, thus preventing subsequent rises in temperature.

We claim:

1. A fire prevention and extinguishing system which comprises:

a carbon bed including an optical fibre which extends throughout said bed, said fibre being in optical communication between a light transmitter and a light detector, a supply of fire extinguishing fluid communicating with said bed by means of a conduit, said conduit being provided with a valve, said valve being actuable by an effective decrease in light detected by said detector, said fibre being fusable at a predetermined elevated temperature, such that in operation fusion of said fibre at said temperature causes an effective decrease in light detected by said detector, actuation of said valve and flow of fire extinguishing fluid to said bed.

2. A carbon bed absorber according to claim 1, wherein said optical fibre is made of glass.

3. A carbon bed absorber according to claim 1, wherein said optical fibre is made of plastics material.

4. A carbon bed absorber according to claim 1, wherein the fire extinguishing fluid is selected from water, carbon dioxide or a suitable halocarbon.

5. A fire prevention and extinguishing system according to claim 1, wherein said fibre extends in a meandering path throughout said bed, so that a local area of said bed at said predetermined elevated temperature causes a portion of said fibre to fuse.

* * * * *